UNITED STATES PATENT OFFICE.

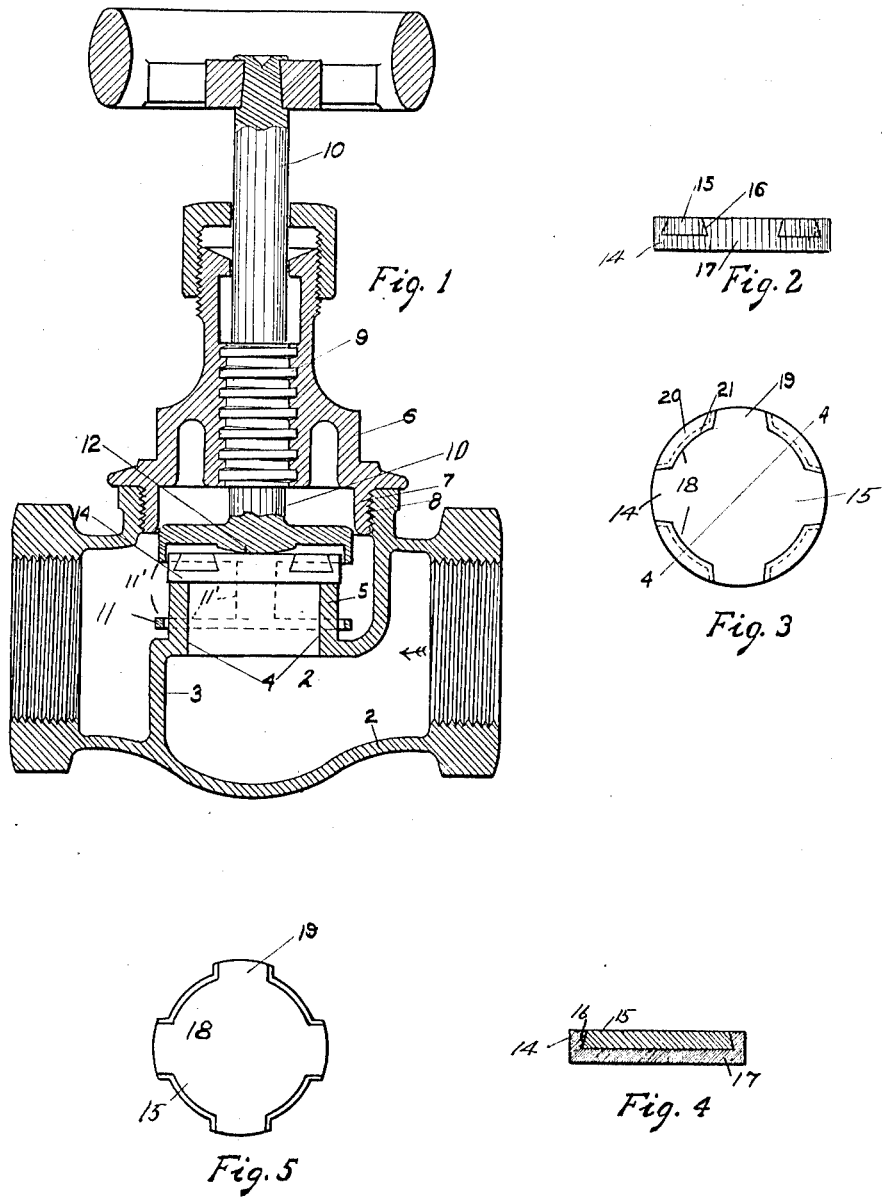

GEORGE HART, OF WILLIAMSPORT, PENNSYLVANIA.

VALVE-DISK.

1,072,004.  Specification of Letters Patent.  Patented Sept. 2, 1913.

Application filed June 13, 1912. Serial No. 703,403.

*To all whom it may concern:*

Be it known that I, GEORGE HART, a citizen of the United States of America, residing at Williamsport, county of Lycoming, State of Pennsylvania, have invented certain new and useful Improvements in Valve-Disks, of which the following is a specification.

This invention relates to a composite disk which is particularly adapted for use as a floating disk in valves, though it may be otherwise applied.

In various localities the water contains a large percentage of sulfur and other soluble compounds which attack metal. The water and other liquids handled in various manufacturing processes have similar properties. The floating disks, of the nature to which this invention relates, are interposed directly in the path of the stream, and often the liquid impinges against the bottom face of the disk with great force. Under these circumstances, a prolonged flow of water thus charged, and liquids having similar corrosive properties, will, in a short time wear away the bottom surface of the metal valve disk so that it soon becomes inoperative to close tightly the valve opening.

Numerous valves have been constructed consisting of a metal disk in which a rubber ring is inserted, but the action of the liquid is frequently sufficient to remove enough of the metal to unseat the ring. The abrasive action of the valve seat upon the disk is also greatly increased by this chemical action.

Various organic materials, as rubber, asphalt, and the like, are not attacked by the chemical compounds to which I refer, such materials are herein designated as resistive materials, but a disk made of the softer organic compounds has not sufficient rigidity to make a tight closure at the excessive hydraulic pressures which are frequently employed, and the various hard, organic materials, as hard rubber and the numerous substitutes, are so brittle and friable, that they crack when pressed tightly against the seat.

The object of the present invention is to provide a valve disk of sufficient strength to withstand the stress applied to it when it is forced against the valve seat in closing the valve against high pressures, and at the same time having a face, which is exposed to the action of the current, composed entirely of resilient, organic, or other resistive material, that is, material which is not acted upon by the various sulfur and other similar soluble compounds. Therefore I make my valve disk with a metal spud or frame to receive the pressure of the valve stem, and a body or bottom disk of organic or resistive material to be opposed to the liquid current and to contact with the seat, the metal spud which receives the pressure of the stem serving to distribute the stress over the organic body and thereby press the organic material against the seat at all points, and, at the same time, to prevent cracking of the body, *i. e.*, the organic material.

In its preferred form the valve disk consists of a metal spud or top disk and a body or bottom disk of organic material, the spud being embedded in the top face of the body and interlocked therewith. I thus have a valve disk with a metal top face and a bottom face of organic material. Preferably, to improve the interlocking action and make it substantially impossible to separate the metal from the rubber, I form the spud or top disk with its edges beveled or inclined inward toward the top, so that there is in effect a dove-tailed connection between the metal and the organic material.

In the accompanying drawings I have illustrated my invention in the most practical form in which it has been produced up to the present time.

Figure 1 is a vertical, central cross-section of a hydraulic valve provided with a floating disk constructed in accordance with my invention. Fig. 2 is an elevation of the disk. Fig. 3 is a top plan of the same. Fig. 4 is a vertical, central section on the line 4, 4, Fig. 3. Fig. 5 is a top plan view of the spud or metal disk.

The valve shown in Fig. 1 consists of a chamber or body portion 2 divided by means of an internal wall 3, pierced by a vertical aperture 4, surrounded by an upwardly disposed seat 5. There is the usual bonnet 6 threaded at 7 to engage a threaded bonnet opening 8 in which it is seated. The bonnet has a central, vertical opening 9, threaded to receive the valve stem 10 which is correspondingly threaded, and the stem is provided at its lower extremity with a depending disk box 11 shown as integral with the stem and having openings 11′ at the sides. In the form shown, the disk box is provided with a central convexity at 12. This is to bear upon the top surface of the valve disk as hereinafer described.

Within the box 11 is the valve disk 14 of a diameter slightly greater than the valve seat. This disk is mounted to float, that is, it is free to move up and down in the box relatively to the seat. The flow through the valve is in the direction of the arrow, i. e., from right to left and upward through the seat, the liquid on the right side of the valve being under pressure. If the stem is slightly withdrawn, i. e., unscrewed, the pressure being removed from the top of the valve disk, the liquid forces the disk upward and passes onward through the valve chamber. If for any reason back pressure occurs, the disk drops to its seat and closes the valve, and to this extent it acts as a check valve.

The disk 14, shown in Figs. 2, 3, 4 and 5, consists of a top disk, spud or frame 15 of metal, in its preferred form, having its edges beveled at 16 and inclined inward toward the top surface, and a body or bottom disk 17 of resilient, organic or resistive material, as rubber, asphalt, or the like, the spud or frame being seated in the body, forming a valve disk with a metal top or bearing surface, and a bottom or seating surface, to be opposed to the liquid current and composed entirely of organic or resistive material.

The spud 15, as shown in Figs. 2, 3, 4 and 5, consists of a disk 18 having short radiating arms 19, the extreme radius of the spud being substantially equal to or slightly less than the radius of the valve disk and of the body. When the spud is forced into the body, it forms a metal top surface to the disk, leaving unsupported only short segments 20 of the body material, but the circumference of the spud at 21 between the arms 19 is of about the same radius as the valve seat, and the stress transmitted to the body of organic material is only that of compression. When the disk is placed in the box 11 and the valve closed, the central convexity 12 of the box bears against the center of the spud, forcing the bottom face of the disk against the valve seat. The spud is so placed that it takes up the pressure applied to the valve stem and distributes it over the body of the disk 17 so that the disk is compressed but not subject to transverse stress to any considerable extent, the elasticity of the body material being so much greater than that of the metal, that the transverse stress is taken up entirely by the metal. The resilient portion of the body is compressed between the seating surface and the spud, forming a tight closure of the valve, which is not subject to decomposition or abrasion by the chemical properties of the water to which I have referred, the body portion being so placed and disposed that it receives the impact of the liquid at all times as the valve is opened and closed, protecting the metal spud.

I have thus described in minute detail a single embodiment of my invention in order that its nature and operation may be fully understood. However, the specific terms herein are used in their descriptive rather than in their limiting sense, and the features of the device may be widely varied without departure from the principle of my invention, the scope of which is defined in the claims.

I claim—

A valve disk consisting of a metal spud in the form of a disk with short radial arms, a body or bottom disk of resilient, resistive material of substantially the same diameter, the spud being embedded in the body, forming a valve disk with a metal top and a bottom face entirely of resistive, resilient material.

Signed by me at Williamsport, Pa., this first day of June 1912.

GEORGE HART.

Witnesses:
AMOS K. BROWN,
WALTER HART.

Copies of this patent may be obtained for five cents each, by addressing the "Commissioner of Patents, Washington, D. C."